Jan. 5, 1943.  T. A. TE GROTENHUIS  2,307,082
METHOD OF FROTHING LATEX
Filed Nov. 30, 1939
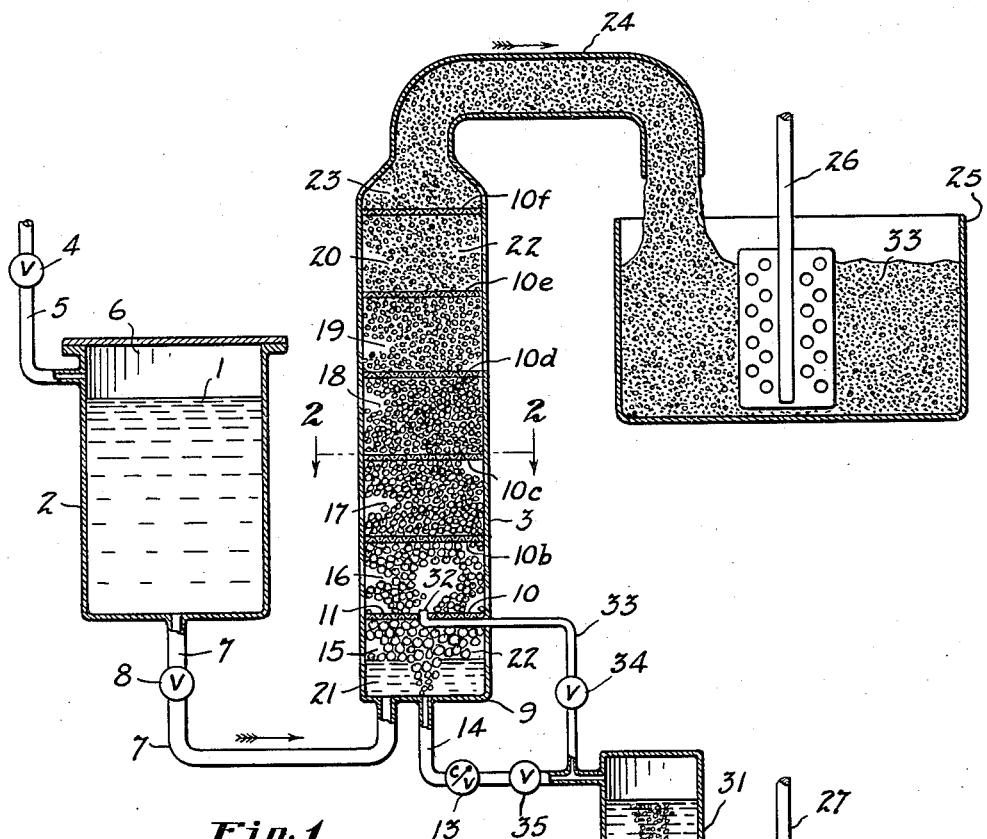
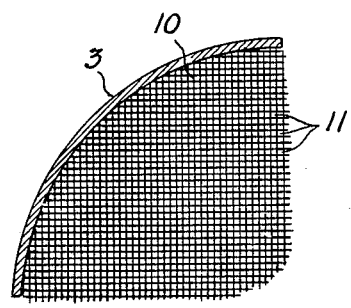
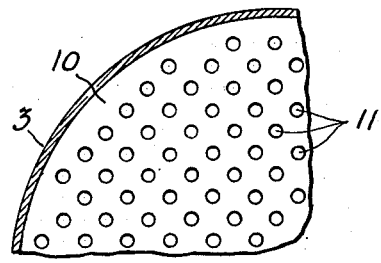
INVENTOR
THEODORE A. Te GROTENHUIS
BY
Evans + McCoy
ATTORNEYS Patented Jan. 5, 1943

2,307,082

UNITED STATES PATENT OFFICE 2,307,082

METHOD OF FROTHING LATEX

Theodore A. Te Grotenhuis, Olmsted Falls, Ohio

Application November 30, 1939, Serial No. 306,920

9 Claims. (Cl. 260—723)

This invention relates to a method of frothing liquids, and particularly to a method of frothing latex or aqueous dispersion of rubber-like material for the production of porous sponge rubber articles.

In the preparation of latex sponge rubber articles, such as seat cushions, mattresses, etc., of high quality, a suitably compounded latex is formed into a froth having a volume which is several times the volume of the original latex and having very fine bubbles. This froth is then gelled and cured in a suitable mold.

A froth having only fine bubbles is desirable for the production of articles having fine texture and with suitable resilience. Various methods for producing a froth have been proposed, among which are whipping the latex with high speed beaters of special design, and forcing air through the false bottom of a container filled with a suitably compounded latex.

While the froth produced by whipping air into latex usually has good texture, the method is undesirable because it has not been successful as a continuous process, and the power required to produce a given volume of froth is unduly large. The froth prepared by bubbling air through a liquid, such as latex, is not desirable because there is a preponderance of large bubbles, and a sponge rubber article produced from such a froth has undesirable texture. This method of producing such a froth is also undesirable because a major part of the gas or air used in preparing the froth is not efficiently used.

It is an object of this invention to provide a method for producing a froth of fine texture without a vigorous beating of the liquid.

It is another object of this invention to provide a continuous method for frothing latex wherein the number of large bubbles are reduced to a minimum.

It is a further object of this invention to provide apparatus for continuously preparing latex froth.

It is a still further object of this invention to provide a continuous method for producing latex froth wherein air or a gas is more efficiently utilized than in processes heretofore used.

Other objects will be apparent from the following description of the drawing, where:

Figure 1 is an elevational sectional view of suitable apparatus illustrating the present invention and showing the frothing of a suitable liquid therein;

Figure 2 is a partial sectional view on the line 2—2 of Figure 1 showing a type of orifice or bubble reducing diaphragm formed of woven wire and used to reduce the size of bubbles in the froth; and Figure 3 is a partial view on the line 2—2 of Figure 1 showing a modified type of diaphragm having a plurality of small orifices which may be used in place of the screen shown in Figure 2 to form froth of a fine texture.

According to this invention, a froth prepared from a suitable liquid such as latex by any suitable process, and which may contain such large bubbles as to be undesirable, is passed through a relatively small orifice, or a series of relatively small orifices, where the bubbles are reduced in size. In the preferred method of frothing latex and similar materials, the liquid and a gaseous material such as air, which is preferably saturated with moisture, are passed into a container at definite rates so that a preliminary froth is formed by the air passing through the liquid, and the froth is then passed through a succession of orifices where its texture is improved by breaking original large bubbles into a series of fine bubbles.

Referring more particularly to the drawing, a suitable supply of latex 1 from the tightly covered reservoir 2 is forced by suitable means, such as the pressure produced by admitting a quantity of compressed gas through the valve 4 and pipe 5, into the space 6 above the liquid of the reservoir 2, through the pipe 7 and valve 8 into the lower portion of the frothing device 9. The frothing device 9 contains one or more baffles 10, each of which contains one or more restricted openings, such as the orifices 11. A series of baffles 10, 10b, 10c, 10d, 10e, 10f, etc., are preferably used, and each baffle preferably has a plurality of relatively small orifices 11, which may be made either by punching or drilling holes in a suitable sheet metal, or may be formed by a plurality of intersecting wires, such as a gauze or screen illustrated in Figure 2. The baffles 10, 10b, 10c, etc., are supported by the wall 3 of the container which may be of cylindrical form. They are spaced from each other to form compartments 15, 16, 17, 18, 19 and 20 of any convenient size.

In the operation of the device, the valve 8 is adjusted so that the level of the unfrothed latex does not reach the baffle 10, and air or other suitable gas which may be obtained from any suitable source is forced through the check valve 13, the regulating valve 35, and a suitable connection 14, into the lower portion 15 of the frothing apparatus 9. The flow of air through the liquid 21 in the chamber 15 causes the formation of a froth 22 in compartment 15 having relatively large bubbles. Because of the increase in volume, this froth is forced through the orifices 11 in the baffle 16, where a substantial proportion of the larger bubbles formed in the compartment 15 are broken and form a plurality of finer bubbles. In a similar manner, by continuing the flow of air the liquid 21 may be entirely converted into froth 21, which fills in succession compartments 16, 17, 18, 19 and 20, and finally overflows through the top compartment 23 and the tube 24 into a suitable container 25.

The valve 8 should preferably be adjusted so that the level of the unfrothed liquid 21 will remain substantially fixed while the froth is being continuously produced.

When the large bubbles of the froth 22 break by coming in contact with the edges of the orifices 11, a portion of the gas and liquid is utilized in the formation of smaller bubbles in situ, a portion of the air becomes free, and a portion of the liquid from the bubbles tends to flow back through the frothed material. It has been found, however, that most of the air obtained from the collapsed bubbles, and most of the excess air which was not originally utilized in the formation of bubbles in compartment 15, is utilized in the refrothing of any excess liquid present in the upper compartments of the device. It may therefore be seen that by passing the froth successively through orifices 11, the bubbles are reduced in size in each successive compartment so that a froth of a fine texture is more efficiently produced. The number of diaphragms 10 may vary considerably, depending upon the frothing power of the latex used, the quantity of air available, etc., but it has been found that a froth of high quality is usually obtained when only three or four successive diaphragms are used.

The diameter of the orifices 11 or other restricted openings, such as small tubes, etc., which may also be used, should preferably approach the diameter of the ultimate bubbles desired, but somewhat larger orifices may be used and smaller bubbles obtained by increasing the air flow through the material. I have found orifices around $\frac{1}{16}$ inch or so in diameter to be entirely satisfactory. It is preferable that the total cross section of the orifices through which the froth passes be either restricted or the air flow increased sufficiently to produce a substantial velocity through the orifices 11. It appears that when the velocity is too low, relatively larger bubbles may sometimes form at the small orifices.

The froth from the compartment 20 passing through the orifices in the diaphragms 10 has the desired texture and is conducted through the tube 24 to a suitable container 25 where the desired quantity for use is measured for subsequent molding operations. The container 25, which may also be used to check the density of the froth, may contain a suitable beater 26 to maintain the froth 33 in a uniform consistency. If, in the formation of porous rubber articles wherein a latex or other dispersion of rubber-like material is used, it is desirable to use a gelling agent. A suitable quantity of such material may be added in the container 25 and mixed in the foam with the beater 26. The froth, having suitable compounding and vulcanizing agents, is then transferred to a suitable mold and cured by any suitable method to produce sponge rubber articles having fine texture. If it is not desirable to utilize the batch method of molding porous rubber articles, the container 25 may be omitted and the froth injected directly into the mold which may, if desired, be of a continuous belt or extrusion type, feeding directly from the tube 24.

When air or other gas is passed through latex or into contact with latex films, a substantial amount of the liquid is absorbed. In the case of latex films, sufficient moisture and protective agents are readily absorbed to cause coagulation of the film. If in the preparation of a froth according to this invention a substantial excess of dry air is used, there may be a tendency for films to form over the orifices or restricted openings 11 in the diaphragms 10, 10b, 10c, etc. It is, therefore, desirable that the air or gas used in preparing the froth have high humidity or preferably be substantially saturated with moisture; and if an ammonia stabilized latex is used, the gas may also contain a small amount of ammonia.

Sufficient moisture may, for example, be added to the gas by passing the gas obtained from the suitable source (not shown) through the pipe 27, regulating valve 28, and through water 30 contained in the tank 31, before it comes in contact with the latex in the compartment 15 of the frothing apparatus 9.

According to this invention, rubber latex and a gas, such as air, are passed simultaneously through orifices, the volume of the latex at no time being sufficient to completely fill them. The volume of air is preferably adjusted so that a small excess of air over that contained in the bubbles of the froth is passed through the orifices 11 and the velocity of travel is increased. Such an excess of air may be provided from the nozzle 32 connected with a suitable source of air, and interposed at any suitable position in the compartment 16 or a later compartment so that air may, if desired, be withdrawn from the humidifier 31 through the pipe 33 and the adjustable valve 34 into the compartments 16, etc.

By properly adjusting the valve 8 so that the desired liquid level is obtained, and by suitably adjusting valves 34 and 35 which regulate the air or gas flow, a froth of very fine texture may be produced in a continuous manner with a minimum loss of air.

The principles of the present invention may be utilized in various ways, numerous modifications and alterations being contemplated, substitution of parts and changes in construction being resorted to as desired, it being understood that the embodiment shown in the drawing and described above is given merely for purposes of explanation and illustration without intending to limit the scope of the claims to the specific details disclosed.

I claim:

1. The process of frothing a frothable dispersion of a rubber-like material, which comprises passing a rubber dispersion at a controlled rate into a suitable container, passing a gas through the dispersion in the container to produce an uncoagulated froth, passing the froth and excess humid gas in an upward direction through a plurality of relatively small orifices incorporating the froth thus produced into a mold and curing the rubber surrounding the pores thereof, said gas supply being regulated in such a manner that a dense froth of relatively fine pore size is produced.

2. The process of frothing a frothable dispersion of a rubber-like material, which comprises passing a rubber dispersion at a controlled rate into a suitable container, passing a humid gas through the dispersion in the container to produce an uncoaguated froth, passing the froth and excess gas in an upward direction through a plurality of relatively small orifices, said gas supply being regulated in such a manner that a dense froth of relatively fine pore size is produced.

3. The process of frothing a frothable dispersion of a rubber-like material, which comprises passing a rubber dispersion at a controlled rate into a suitable container, passing a gas substantially saturated with moisture through the dispersion in the container to produce an uncoagulated froth, passing the froth and excess gas in an upward direction through a plurality of relatively small restricted openings, said gas supply being regulated in such a manner that a dense froth of relatively fine pore size is produced.

4. In a process for producing sponge rubber articles from aqueous rubber dispersions wherein suitably compounded latex is prepared into a flowable froth and the froth gelled and cured in the desired form, the step which comprises passing the latex and a humid gas simultaneously through a plurality of fine openings, the latex not completely filling any of said openings, removing the froth to a mold and curing the rubber of the froth, whereby a formed sponge rubber article is produced.

5. A process of continuously preparing sponge rubber from compounded aqueous rubber dispersions, which comprises continuously passing air into a compounded aqueous rubber dispersion to produce a flowable froth having relatively large pore size, continuously passing the latex of said froth together with humid air through a plurality of restricted openings to reduce the pore size thereof, the humidity of said humid air being sufficient to prevent drying of said latex over said restricted openings, continuously removing the froth having the reduced pore size to a forming mold and continuously gelling the froth and curing the rubber thereof, whereby formed sponge rubber is substantially continuously formed.

6. A process of continuously preparing sponge rubber from compounded aqueous rubber dispersions, which comprises passing air into a compounded rubber latex to provide an ungelled froth, passing the froth and humid air through a plurality of relatively small openings to reduce the pore size of the froth, removing the froth after it is passed through said openings and incorporating it into a mold, and then gelling and curing the rubber, said humid air having sufficient humidity to prevent coagulation of said latex over said relatively small openings.

7. In a process for continuously preparing sponge rubber having fine texture from aqueous dispersions of a rubber-like material, the steps which comprise continuously passing an inert gas into rubber latex, continuously passing the frothed latex with humid gas through a succession of restricted openings spaced along the path of travel, incorporating said froth into a continuous belt-type mold and curing the froth therein in the desired shape, the supply of said gas and said latex being regulated to produce a froth of the desired density, the humidity of said gas being sufficient to prevent drying of said latex over said restricted openings.

8. In a process for continuously preparing sponge rubber having fine texture from aqueous dispersions of a rubber-like material, the steps which comprise continuously passing an inert gas into rubber latex, continuously passing the frothed latex with humid gas through a succession of restricted openings having a diameter of up to about one-sixteenth of an inch, incorporating said froth into a mold and curing the froth therein in the desired shape, the supply of said gas and said latex being regulated to produce a froth of the desired density, the humidity of said gas being sufficient to prevent drying of said latex over said restricted openings.

9. In a process for continuously preparing a homogeneous sponge rubber having fine texture from aqueous dispersions of a rubber-like material, the steps which comprise continuously passing an inert gas into rubber latex, continuously passing the frothed latex with humid gas through a succession of restricted openings spaced along the path of travel, incorporating said froth into a continuous belt-type mold and curing the froth therein in the desired shape, the supply of said gas and said latex being regulated to produce a froth of the desired density, the humidity of said gas being sufficient to prevent drying of said latex over said restricted openings.

THEODORE A. TE GROTENHUIS.